United States Patent [19]

Schaefer

[11] 4,043,779

[45] Aug. 23, 1977

[54] APPARATUS FOR CHOPPING COATED GLASS FIBERS

[75] Inventor: William L. Schaefer, Gibsonia, Pa.

[73] Assignee: PPG Industries, Inc., Pittsburgh, Pa.

[21] Appl. No.: 742,807

[22] Filed: Nov. 18, 1976

Related U.S. Application Data

[63] Continuation-in-part of Ser. No. 664,839, March 8, 1976, abandoned.

[51] Int. Cl.² .............................................. C03B 37/02
[52] U.S. Cl. ........................................ 65/2; 29/121.6; 65/3 R; 65/11 W; 65/11 R; 83/913; 83/922; 118/36
[58] Field of Search ..................... 65/2, 3 R, 3 A, 3 C, 65/11 R, 11 W; 29/121 R, 121 H; 118/36; 83/22, 438, 913, 922

[56] References Cited

U.S. PATENT DOCUMENTS

| 2,719,350 | 10/1955 | Slayter et al. | 65/11 X |
| 2,729,030 | 1/1956 | Slayter | 65/11 X |
| 3,029,993 | 4/1962 | Russell | 65/11 X |
| 3,056,164 | 10/1962 | Reichel et al. | 29/121 H X |
| 3,869,268 | 3/1975 | Brian | 65/2 |

Primary Examiner—Robert L. Lindsay, Jr.
Attorney, Agent, or Firm—Alan T. McDonald; John E. Curley

[57] ABSTRACT

An improved apparatus for chopping glass strands is disclosed. The improvement comprises a feed roll for attenuating the strand prior to chopping with a surface having a series of deep grooves cut at desired angles with respect to the sidewalls of the roll. These special grooves reduce binder collection on the surface of the feed roll thereby reducing the tendency of glass strand to wrap around the feed roll during attenuation.

10 Claims, 4 Drawing Figures

U.S. Patent     Aug. 23, 1977     4,043,779
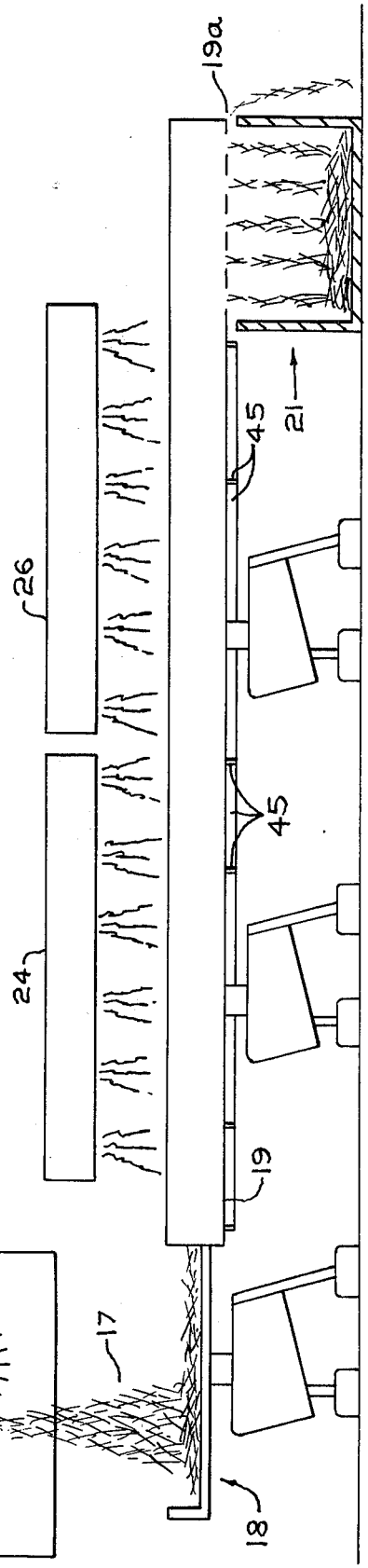
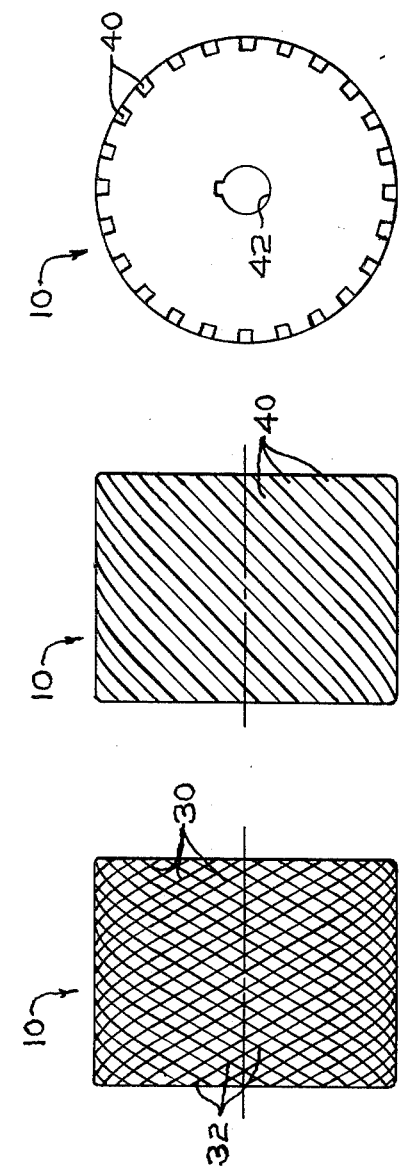
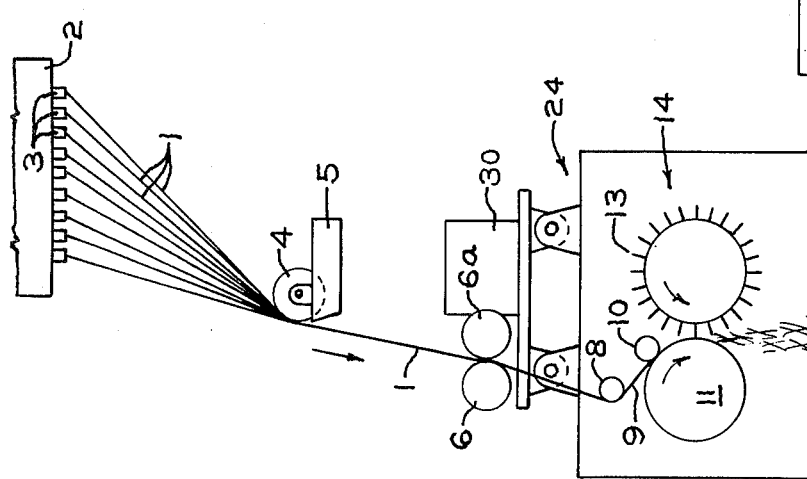

APPARATUS FOR CHOPPING COATED GLASS FIBERS

REFERENCE TO CROSS-RELATED APPLICATIONS

This application is a continuation-in-part of Application Ser. No. 664,839, filed Mar. 8, 1976 now abandoned.

BACKGROUND OF THE INVENTION

In U.S. Pat. No. 3,869,268, assigned to the assignee of the present invention and incorporated herein by reference, a method and apparatus for chopping glass strands is disclosed. The apparatus includes a roll having a plurality of cutting blades embedded therein and a backup roll having a resilient surface such that when glass strand passes between the two rolls, glass strand is chopped therebetween. The apparatus further includes a feed roll formed of a nonresilient material, such as stainless steel, in contact with the backup roll. The combination of these two rolls provides the attenuation forces necessary to attenuate continuous glass strand from bushing tips in a bushing to provide the source of glass strand for the chopping operation. In this patent, the feed roll is disclosed as having a knurled surface to provide the necessary tractive force between the glass strand and the two rolls.

There is a problem associated with the feed roll of the prior art. As the glass strand is attenuated, it is coated with a binder and/or size. The wet glass strand is then passed between the feed roll and the backup roll. The binder and/or size readily accumulates in the knurled surface of the feed roll thus quickly forming a smooth surface on the feed roll. When this occurs, the glass strand tends to wrap around the feed roll rather than continuing between the backup roll and the cutting roll. This stops the continuous formation of chopped glass strand and adversely affects production due to the time required to unravel the strand and clean or replace the feed roll. It is desirable, therefore, to provide a feed roll which prevents the problems associated with the prior art system from occurring during processing.

THE PRESENT INVENTION

By means of the present invention, a feed roll is provided for a chopped glass strand process and apparatus which hinders binder accumulation thereon and which will thus prevent wrapping of the glass strand around the feed roll and the problems associated therewith.

The feed roll of the present invention replaces the knurled surfaced prior art feed roll with a series of deep parallel grooves in the surface thereof. These grooves are preferably formed at an angle of about 30 to about 80 degrees with respect to one sidewall of the feed roll. These grooves provide the tractive forces necessary to attenuate the glass strand. At the same time, as the feed roll rotates, the configuration of the grooves throws off binder rather than allowing it to quickly accumulate in the grooves. Because of this tendency of the feed roll of the instant invention to throw off rather than accumulate binder during rotation, the surface does not quickly become smooth and glass strand does not wrap around the feed roll as quickly as with the prior art feed rolls.

BRIEF DESCRIPTION OF THE DRAWINGS

FIG. 1 is a diagrammatic representation of the method and apparatus for forming chopped glass fiber strand according to the present invention.

FIG. 2 illustrates the knurled surface of the prior art feed roll.

FIG. 3 illustrates the grooved feed roll surface of the present invention.

FIG. 4 is an end view of the feed roll of FIG. 3.

DETAILED DESCRIPTION OF THE DRAWINGS

Referring now to FIG. 1, glass filaments 1 are drawn through a bushing 2 having a plurality of orifices or bushing tips 3. The fibers 1 are coated before contacting each other. The coating composition can be any lubricant binder and/or size which provides compatibility with the final use of the fibers and affords adequate binding properties to adhere the single filaments to each other to form a strand. A wide variation of binders and/or sizes may be used in the process of the instant invention. Due to the integration of the forming and chopping processes, there is no need for providing sizes which protect the fibers during winding, unwinding, and like steps. The sizing composition is applied by passing the filaments 1 over an applicator 4 which may be, for example, a roller applicator, a belt applicator, or the like, and which is immersed in a bath 5 of the sizing composition. The bath 5 is usually fed by pumping the binder and/or size from a hold tank, not shown, to the bath 5.

The filaments 1 are passed between a pair of start-up or pull rolls 6 and 6a, which attenuate the filaments 1 at a low speed to begin the fiber forming process. While the pull rolls 6 and 6a are in operation, the glass fibers being formed are disposed of by means of a waste chute, not shown. When the chopping process is begun, the glass filaments 1 being formed are placed around a guide or gathering shoe 8 which is generally a grooved cylinder which gathers the filaments 1 together and forms them into one or more strands 9. The gathering shoe 8 traverses in a horizontal plane through a small distance of travel across the face of the wheel 11 by a traversing means, not shown.

The strands 9 are passed under a free wheeling feed roll 10 which aligns the strands 9 with a cutting section. The feed roll 10 is juxtaposed and in frictional contact with a cot roll or backup roll 11 at their circumferential surfaces. Having the strand in contact with both rolls 10 and 11 provides the attenuation necessary to form the fibers 1. Generally the fibers 1 are attenuated at speeds of from about 2,000 to about 3,000 feet per minute (609.6 to 914.4 meters per minute) or more.

As can be seen in FIG. 2, the knurled surface of the prior art feed roll 10 comprises a series of indentations 32 at an angle of approximately 45° – 60° from one sidewall of the feed roll 10 and a series of indentations 30 at an angle of approximately 120° – 135° to the same sidewall of the feed roll 10. This forms a plurality of diamond-shaped protrusions. The indentations are slight, being in the order of about 0.03125 inch (0.079375 centimeter). With these small indentations, binder and/or size readily accumulates in the indentations, thus producing a smooth surface and causing strand wraps.

As can be seen in FIGS. 3 and 4, the feed roll 10 of the present invention comprises a plurality of deep grooves 40 cut oblique to the rotational surface of the roll and in parallel with each other and each groove forming an acute angle with one sidewall of the roll and an obtuse angle with respect to the opposite sidewall, where the sum of the angles equals about 180°. When the sidewalls are parallel to one another, the sum of these angles equals exactly 180°. However, if the sidewalls are not completely parallel, the sum of the angles will vary slightly higher or lower than 180°. Preferably, the sidewalls are parallel and the sum of the angles will equal 180°. These grooves are preferably about 0.1875 inch (0.47625 centimeter) deep at their center and preferably about 0.0625 inch (0.15875 centimeter) in width, far wider and deeper than the knurls of the prior art feed rolls. These grooves preferably are of a constant depth but may vary in depth along their length. If varied along their length this may be, for example, about 0.0625 inch (0.15875 centimeter) at their ends and about 0.1875 inch (0.47625 centimeter) at their centers. The acute angle of the grooves 40 with one sidewall of the feed roll 10 preferably ranges from about 30° to about 80°. Outside of this range of angles, vibrations of the feed roll and cot roll can occur in use. Particularly effective are feed rolls formed with grooves with acute angles between 45 and 75 degrees.

The feed roll 10 is formed of a nonresilient and inflexible material which will not abrade due to the glass strands passing thereover and which will not be damaged by the binders and/or sizes employed. Stainless steel is a particularly effective material for these purposes.

Due to the combination of depth and width of the grooves 40 with respect to the rotational axis of the feed roll 10, binder and/or size contacting the roll surface is thrown off of the surface of the feed roll 10 and out of the grooves in it rather than becoming entrapped therein. Due to this continuous throwing off of binder during rotation, the surface of the feed roll 10 of the present invention does not quickly become smooth, which in turn prevents wrapping of the glass strand 1 around the feed roll 10. This improves the continuous nature of the chopping process and aids in increasing production.

The action which throws the binder off of the feed roll 10 is founded in the width and depth of grooves 40 in the roll 10 and the centrifugal forces acting on the binder which is in the grooves 40. As the feed roll 10 rotates, excess binder which is scraped off the glass fiber strands 9 by the edges of the grooves 40 enters the grooves 40. Due to the relatively large dimensions of these grooves 40, as opposed to the dimensions of the knurls 32 previously employed, the centrifugal forces generated by the rotation of the feed roll 10 restrict the binder from reaching and accumulating in the bottoms of the grooves 40. Instead, the binder is held against the sides of the grooves 40. As more wet binder enters, the amount of binder present on the sides of the grooves 40 reaches their limits, the excess is ejected along the sidewalls of the feed roll 10.

The angle of the grooves 40 with respect to the sidewalls may aid in directing the excess binder towards the sidewalls. However, this is not the major reason for their presence. It has been found that, with grooves 40 approaching both the perpendicular and the parallel with respect to the sidewalls, vibrations between the feed roll 10, cot roll 11 and strands 9 may occur. This adversely affects the chopping process and reduces chopper life. Thus, to eliminate this vibration problem, the grooves 40 are preferably located at an acute angle of between about 30° and 80° with respect to one sidewall.

The strand or strands 9 are passed between cot roll 11 and the cutting edges 13. The cutting edges 13 are mounted on grooves on a cutter head 14 having a plurality of grooves, not shown in FIG. 1, oriented traversely and oblique with the axis of the cutter head 14.

The cutting wheel 14 is driven by means not shown. The cutting blades 13 are in frictional engagement with the cot roll 11, causing the roll 11 to rotate. The feed roll 10 is in frictional engagement with the cot roll 11, causing the feed roll 10 to rotate.

Thus, the strand or strands 9 are formed in the traversing gathering shoe 8 and attenuated by the grooved feed roll 10 in frictional contact with the cot roll 11 with the strand or strands 9 being pulled between the rolls 10 and 11. The strand or strands 9 are then chopped by the blades 13 while frictionally contacting the cot roll 11.

The chopped strands or particular glass fiber bundles 17 then fall onto a first vibratory conveyor 18, which agitates chopped strand 17 which has a moisture content typically from about 9 to 11 percent by weight due to the aqueous binder and/or size previously applied. The vibratory action maintains the chopped strands 17 in discrete glass fiber bundles rather than having the bundles adhere to each other.

The chopped strand 17 is passed from the first vibratory conveyor to a second vibratory conveyor 19 having an amplitude of vibration less than the first vibratory conveyor 18. Associated with the second vibratory conveyor 19 are heaters 24 and 26 which may be, for example, infrared heaters, gas ovens, etc. As the chopped strand 17 is conveyed along the second conveyor 19, it is reduced in moisture content to less than 0.1 percent by weight by the applied heat. The second vibratory conveyor 19 is more fully described in copending U.S. Application Ser. No. 638,481, filed Dec. 8, 1975 in the names of Donald E. McWilliams and William L. Schaefer and a suitable drying mechanism is described in copending U.S. Application Ser. No. 650,817, filed Jan. 20, 1976 in the name of William L. Schaefer, the disclosures of which are incorporated herein by reference.

The terminal portion 19a of the second conveyor 19 is foraminous in order that the dried chopped strand 17 falls through the apertures in the conveyor and into a collection package 21. Oversized material is removed at the end of the conveyor.

Additionally, if the glass fiber bundles 17 are not of the proper size, they will not pass through the apertures and the foraminous portion 19a of the conveyor 19, thus being isolated from the desired size product which is a chopped strand of uniform length.

As can again be seen in FIG. 4, the feed roll 10 has a plurality of grooves 40 on the surface thereof. FIG. 4 also illustrates a key 42 through which a rod passes to hold the feed roll 10 in place on the chopping apparatus.

EXAMPLE

Glass fiber chopping apparatus as illustrated in FIG. 1 was operated using as the feed roll 10 a stainless steel roll having grooves as illustrated in FIGS. 3 and 4. The grooves were at an acute angle of 75 degrees with respect to one sidewall of the roll. Glass strand was attenuated at a speed of 2,500 feet per minute (762 meters per minute) and chopped into fibers having a length of 0.125 inch (0.318 centimeter) for a period of 168 hours. No wrapping of glass strand around the feed roll occurred during this time period due to accumulation of binder and/or size on the feed roll. The grooves had a depth of 0.1875 inch (0.47625 centimeter) at the center and a width of 0.0625 inch (0.15875 centimeter).

Thus, it is clear that by means of the present invention, glass fiber strand may be chopped continuously for long periods of time without requiring shut down caused by strand wrapping around the feed roll.

While the invention has been discussed with reference to specific embodiments thereof, it is not intended to be so limited thereby except insofar as in the accompanying claims.

I claim:

1. In an apparatus for forming and chopping glass fiber strand comprising: a glass fiber forming bushing from which continuous filaments are drawn, means for applying a binder and/or size to said filaments, means for consolidating said filaments into one or more continuous glass fiber strands, a first wheel having a smooth flexible surface, a second wheel juxtaposed and contacting said first wheel at the circumferential surfaces thereof, said first wheel and said second wheel providing attenuate forces to said glass fiber strand or strands and the filaments associated therewith, a third wheel having positioned thereon a plurality of cutting edges mounted in a plurality of grooves provided on the periphery of said third wheel, means for rotating said first, second and third wheels and means for collecting the particular glass fiber bundles formed, the improvement wherein said second wheel has a plurality of grooves oblique to the rotational surface of said second wheel at an acute angle with respect to one sidewall of said second wheel and an obtuse angle with respect to the other sidewall of said second wheel, the sum of the acute and obtuse angles equaling about 180°, said grooves being of sufficient width and depth to continuously eject binder from the surface of said second wheel by centrifugal force upon rotation of said second wheel and said acute angle being sufficient to prevent vibrations of said apparatus.

2. The apparatus of claim 1 wherein said grooves are at an acute angle of between 30° and 80° from said one sidewall of said second wheel.

3. The apparatus of claim 2 wherein said acute angle is between 45° and 75°.

4. The apparatus of claim 1 wherein said grooves are of a constant depth of about 0.1875 inch (0.47625 centimeter) in depth and 0.0625 inch (0.15875 centimeter) in width.

5. The apparatus of claim 1 further comprising means for conveying said particular glass fiber bundles to said means for collecting, means for collecting the glass fiber bundles and means for reducing said glass fiber bundles in moisture content.

6. The apparatus of claim 5 wherein said means for conveying is a two-stage vibratory conveyor.

7. In a method of preparing particulate glass fiber strand comprising forming a plurality of continuous glass elements from a glass fiber bushing, applying an aqueous binder and/or size to said filaments, consolidating said filaments into one or more continuous glass fiber strands, passing said strand or strands into an attenuation zone, attenuating said strand or strands and the filaments associated therewith in said zone, passing the strands from said attenuation zone to a cutting zone, feeding said strand or strands between cutting blades and a resilient surface capable of being depressed by said cutting blades, to thereby cut said continuous strand or strands into discrete lengths, and collecting said discrete lengths of glass fiber strand so formed, the improvement comprising attenuating the strand to be cut between a smooth surfaced roll and a feed roll, providing on the feed roll a plurality of grooves oblique to the rotational surface thereof, said grooves forming an acute angle with respect to one sidewall of said feed roll and an obtuse angle with the other sidewall of said feed roll, the sum of the acute and obtuse angles equaling about 180°, said grooves being of a sufficient width and depth to continuously eject binder from the surface of said feed roll by centrifugal force as the roll is rotated during the attenuation of said strand and said acute angle being sufficient to prevent vibrations during operation.

8. The method of claim 7 wherein said grooves are at an acute angle of between 30° and 80° with one sidewall of said roll.

9. The method of claim 8 wherein said acute angle is between 45° and 75°.

10. The method of claim 7 wherein said grooves are of a constant depth of about 0.1875 inch (0.47625 centimeter) in depth and 0.0625 inch (0.15875 centimeter) in width.

* * * * *